United States Patent
Kella et al.

(10) Patent No.: US 8,212,847 B2
(45) Date of Patent: Jul. 3, 2012

(54) ELECTROGRAPHIC DOT GAIN AND OPTICAL DENSITY DECOUPLING METHOD, XEROGRAPHIC IMAGE REPRODUCTION, AND SYSTEMS, METHODS AND SOFTWARE RELATED THERETO

(75) Inventors: Dror Kella, Nes-Ziona (IL); Ron Maurer, Haifa (IL); Ayelet Pnueli, Rehovot (IL); Mani Fischer, Haifa (IL); Eyal Shelef, Tel-Aviv (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 622 days.

(21) Appl. No.: 12/440,698

(22) PCT Filed: Sep. 13, 2006

(86) PCT No.: PCT/US2006/035527
§ 371 (c)(1),
(2), (4) Date: Mar. 10, 2009

(87) PCT Pub. No.: WO2008/033126
PCT Pub. Date: Mar. 20, 2008

(65) Prior Publication Data
US 2010/0003045 A1  Jan. 7, 2010

(51) Int. Cl.
*B41J 2/435* (2006.01)
(52) U.S. Cl. .......... 347/131; 347/240; 347/251
(58) Field of Classification Search .......... 347/131, 347/240, 251, 252, 253, 254
See application file for complete search history.

(56) References Cited

U.S. PATENT DOCUMENTS

| | | | |
|---|---|---|---|
| 4,390,882 A * | 6/1983 | Ohara et al. | 347/253 |
| 5,581,292 A | 12/1996 | Cianciosi et al. | |
| 5,715,067 A | 2/1998 | Katori et al. | |
| 5,748,330 A * | 5/1998 | Wang et al. | 358/3.21 |
| 2007/0237534 A1 * | 10/2007 | Harush et al. | 399/49 |

FOREIGN PATENT DOCUMENTS

EP  0 051 978  5/2002

OTHER PUBLICATIONS

Kacker et al., "Electrophotographic Process Embedded in Direct Binary Search," IEEE Transactions on Image Processing, IEEE Service Center, vol. 11, No. 3, Mar. 2002, pp. 243-257.

* cited by examiner

*Primary Examiner* — Huan Tran

(57) ABSTRACT

A method is provided for decoupling the control of dot gain and optical density in electrophotographic based printing by varying the exposure level for each dot in an image.

19 Claims, 12 Drawing Sheets

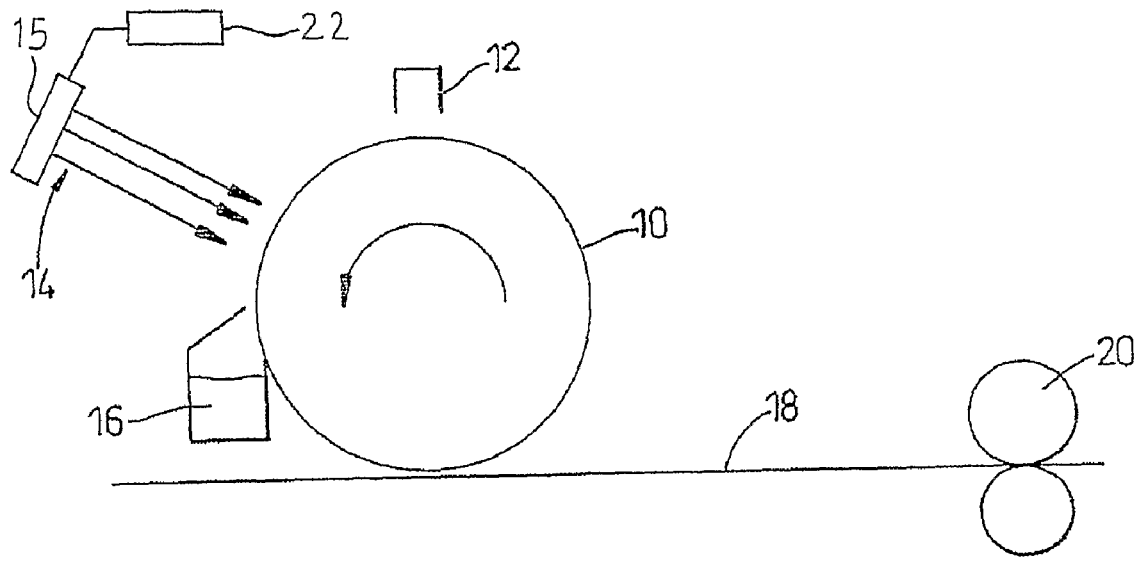
*Fig. 1*
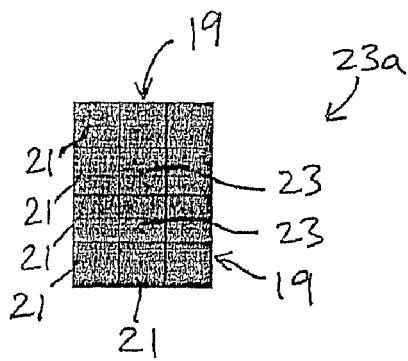
*Fig. 2a*
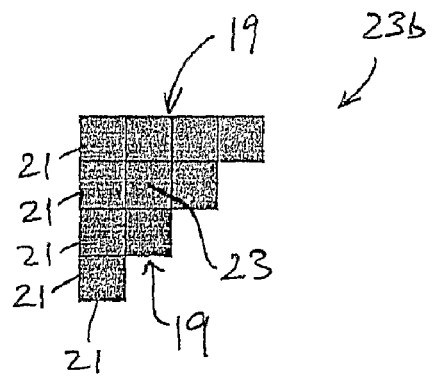
*Fig. 2b*
| Use different light source levels when producing edge dots to when producing non-edge dots | ← 28 |
*Fig. 3*

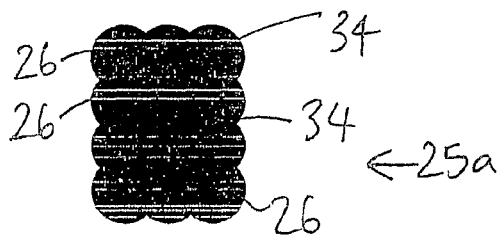
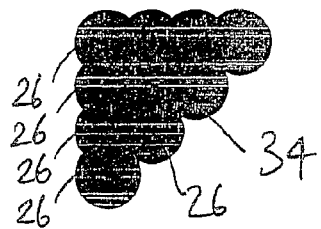
Fig. 4a    Fig. 4b
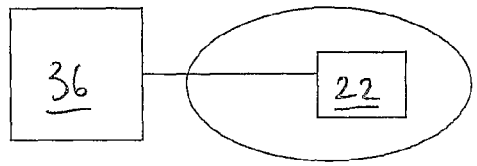
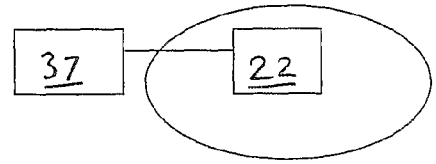
Fig. 5a    Fig. 5b
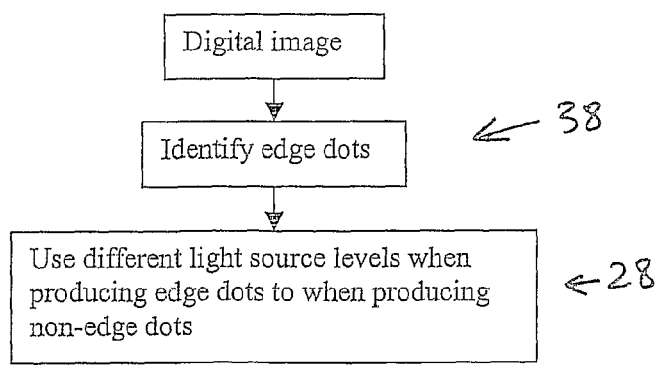
Fig. 6

```
warning off MATLAB:conversionToLogical;
clear;
for opt=1:2,
    fname='lines_circ_320dpc'
    %opt=input('option 1= B on W, 2= W on B);
    aimage=imread([fname '.tif']);
%     aimage=aimage(:,:,4);
    if mod(opt,2)
        aimage=logical(aimage);
    else
        aimage=~logical(aimage);
    end;
    [m,n]=size(aimage);
    bimage=uint8(zeros(size(aimage)));
    %read file and turn to 1 and 0

%define matrices
    mat1=logical([1 1 1;1 1 1; 1 1 1]); %Solid
    mat8=logical([0 0 1;0 1 0;1 0 0]); or8=([0 0 1;0 0 0;1 0 0]);   %Diagonal and
single
    mat9=logical([1 0 0;0 1 0;0 0 1]); or9=([1 0 0;0 0 0;0 0 1]);   %Diagonal and
single
    mat2=logical([0 1 1;0 1 1;1 0 0]); or2=[0 1 1;0 0 1;0 0 0]; %Diagonal
Connection
    mat3=logical([1 0 0;0 1 1;0 1 1]); or3=[0 0 0;0 0 1;0 1 1]; %Diagonal
Connection
    mat4=logical([0 0 1;1 1 0;1 1 0]); or4=[0 0 0;1 0 0;1 1 0]; %Diagonal
Connection
    mat5=logical([1 1 0;1 1 0;0 0 1]); or5=[1 1 0;1 0 0;0 0 0]; %Diagonal
Connection
    mat6=logical([1 0 1;1 1 1;1 0 1]); or6=[1 0 1;1 0 1;1 0 1];
    mat7=logical([1 1 1;0 1 0;1 1 1]); or7=[1 1 1;0 0 0;1 1 1];

for i=2:m-1,
        for j=2:n-1,
            local=aimage(i-1:i+1,j-1:j+1);
            if local(2,2)
                if isequal(local,mat1)
                    bimage(i,j)=15;
                elseif isequal(local|or8,mat8)
                    bimage(i,j)=15;
                elseif isequal(local|or9,mat9)
                    bimage(i,j)=15;
                elseif isequal(local|or2,mat2)
                    bimage(i,j)=10;
                elseif isequal(local|or3,mat3)
                    bimage(i,j)=10;
                elseif isequal(local|or4,mat4)
                    bimage(i,j)=10;
                elseif isequal (local|or5,mat5)
                    bimage(i,j)=10;
                elseif isequal(local|or6,mat6)
                    bimage(i,j)=10;
                elseif isequal(local|or7,mat7)
                    bimage(i,j)=10;
                else
                    bimage(i,j)=5;
                end;
```

Fig. 8

```
              end;
        end;
    end;
%   figure(1); imshow(uint8(double(aimage*255)));
%   figure(2); imshow(uint8(double(bimage)*17));
    switch opt
        case 1
            a1=bimage;
        case 2
            a2=bimage;
    end;
end;
imwrite([a1;a2],[fname '.bmp']);
```

*Fig. 8 continued*

Mat1=Pixel in Solid.

| 1 | 1 | 1 |
|---|---|---|
| 1 | 1 | 1 |
| 1 | 1 | 1 |

(a)

Mat8=single pixel or part of diagonal.

| 0 | 0 | 0 |
|---|---|---|
| 0 | 1 | 0 |
| 0 | 0 | 0 |

(b)

Mat9=part of diagonal.

| 0 | 0 | 0 |
|---|---|---|
| 0 | 1 | 0 |
| 0 | 0 | 0 |

(c)

Following matches induce partial reduction in laser power

Mat2=Diagonal connection.

| 0 |   |   |
|---|---|---|
| 0 | 1 |   |
| 1 | 0 | 0 |

(d)

Mat3= Diagonal connection.

| 1 | 0 | 0 |
|---|---|---|
| 0 | 1 |   |
| 0 |   |   |

(e)

Mat4= Diagonal connection.

| 0 | 0 | 1 |
|---|---|---|
|   | 1 | 0 |
|   |   | 0 |

(f)

Mat5= Diagonal connection.

|   |   | 0 |
|---|---|---|
|   | 1 | 0 |
| 0 | 0 | 1 |

(g)

Mat6=horizontal 1 pixel line

|   | 0 |   |
|---|---|---|
|   | 1 |   |
|   | 0 |   |

(h)

Mat7=vertical 1 pixel line

| 0 | 1 | 0 |
|---|---|---|
|   |   |   |
|   |   |   |

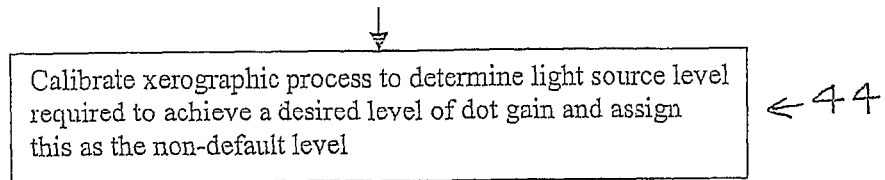
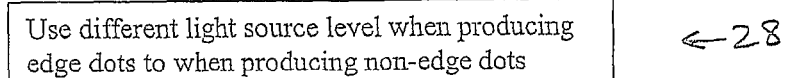
*Fig. 10*
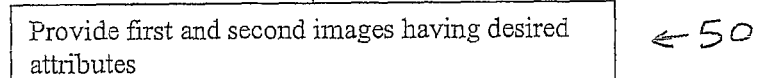
*Fig. 11*
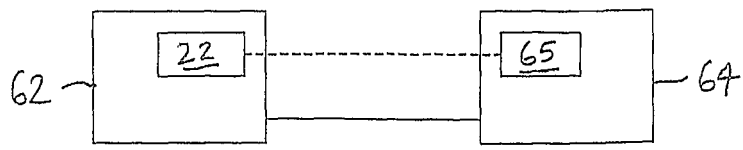
*Fig. 13*

| | Times italic | | tiny bold courier | |
|---|---|---|---|---|
| No DG control | 5 Pt Times<br>6 Pt Tim | | 1 Pt Courier Bold<br>2 Pt Courier Bo<br>3 Pt Couri<br>4 Pt Cou | |
| With DG control | 5 Pt Time<br>6 Pt Tir | | 1 Pt Courier Bold<br>2 Pt Courier Bo<br>3 Pt Couri<br>4 Pt Cou | |

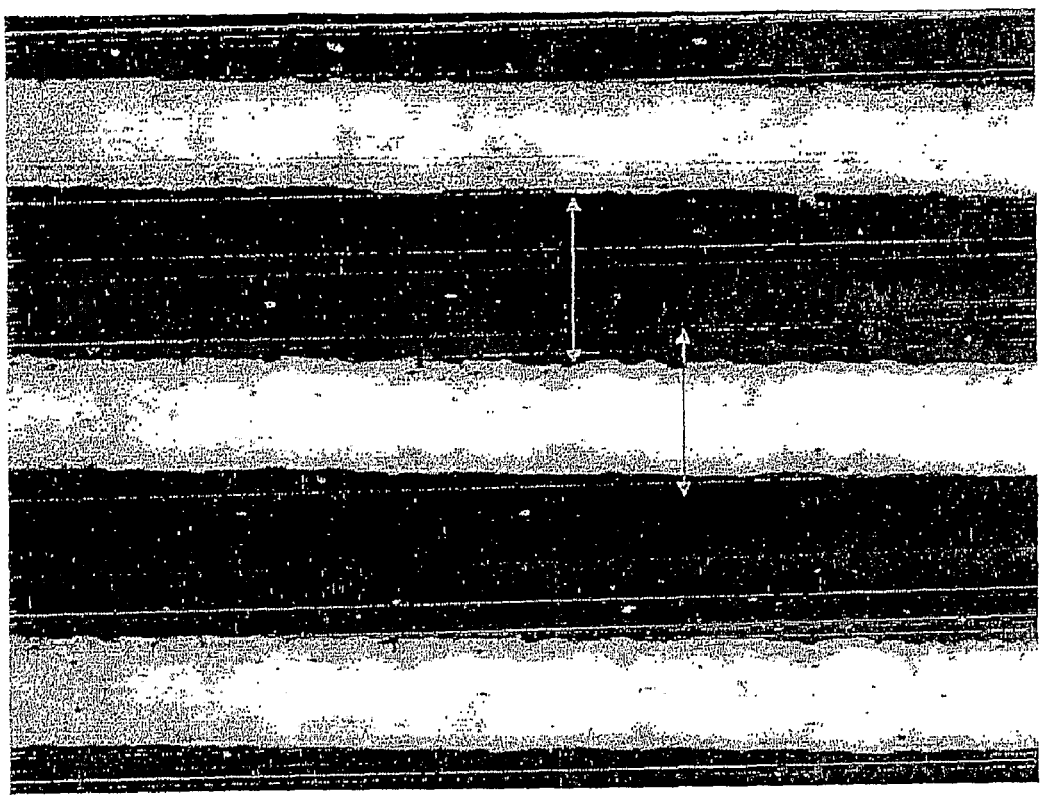
*Fig. 20a*
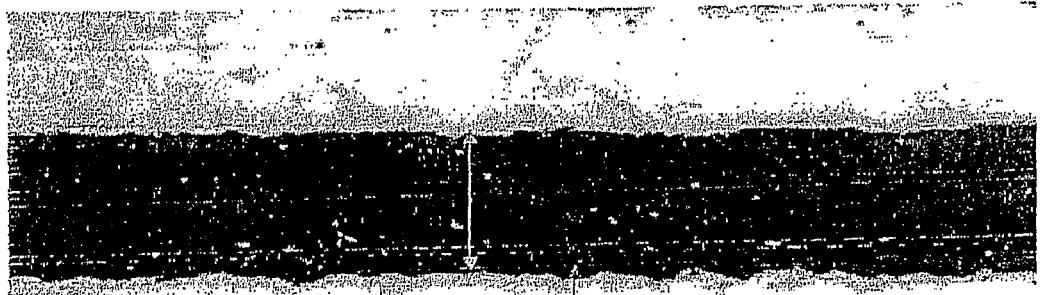
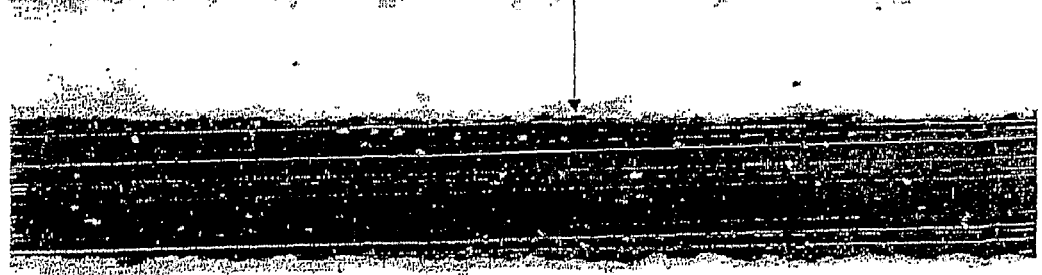
*Fig. 20b*

ELECTROGRAPHIC DOT GAIN AND OPTICAL DENSITY DECOUPLING METHOD, XEROGRAPHIC IMAGE REPRODUCTION, AND SYSTEMS, METHODS AND SOFTWARE RELATED THERETO

BACKGROUND

In this specification, electrographic process means a process for converting a digital image comprising pixels into a latent image comprising dots using light or other exposure means, e.g. from a light source arranged to act on a photoconductive surface, by striking the surface, to form the latent image on the surface by changing the charge distribution on the surface in the regions of the dots, applying a toner/liquid ink to the surface such that the toner/liquid ink adheres to the surface in regions of the latent image and transferring the toner from the surface to a substrate to form a final image. The latent image corresponds to a digital image which is required to be reproduced. Some examples of xerographic machines which use xerographic processes are laser printers, digital printing presses, photocopiers, fax machines, plate setters, direct-to-film laser printers and scanned laser displays.

The term dot is intended to cover any shape which is produced by the light source when forming the latent image, e.g. circles, dashes, lines etc, and could be considered to be "pixel", and is not limited to any particular shape. For example in most laser printers these dots would be substantially circular since they are formed by light from a laser striking a photoconductive surface at a point corresponding to a pixel to be reproduced and charge distribution is affected substantially symmetrically outwardly from this point.

In this specification dot gain means the dot gain associated with an electrophotographic process i.e. it is an expression of the size difference between the dot in the final physical image of the xerographic process (e.g. on paper) compared to the electronic, digital coverage in an original image being copied/printed etc. For example if the xerographic process is used to reproduce an original digital image comprising a pixel, the area covered by toner forming a dot representing the pixel in the final physical image will be different to the area covered by the pixel in the original electronic digital image.

Dot gain can be defined in a number of ways. For example, using the above example, dot gain can be defined as the logarithm of the ratio of the actual dot area (in the final image) and the digital pixel area (in the original image). Alternatively this dot gain can be expressed as the difference between covered area in the final image (i.e. area covered by dots) and covered area in the original image (i.e. area covered by pixels). These two definitions are examples of ways in which dot gain can be defined and both of these examples have the same sign (positive/negative) structure. Using these definitions, if the coverage in the original and final images is the same then the dot gain will be zero. In most printing processes the dot gain is usually non-zero and positive. Using the above example to illustrate, the coverage of the dot in the final image is usually greater than the coverage of the pixel in the original image which the dot represents.

The level of dot gain in an image formed using a xerographic process is dependent on, amongst other things, the way in which the light source acts on the surface to form the latent image. The extent to which light from the light source changes the charge distribution on the photoconductive surface affects the amount of toner or liquid ink (or other pigmenting material) which will adhere to the surface and therefore affects the level of dot gain. As an example, a first latent dot (at the photoconductive surface) may be formed using a xerographic process by a light source discharging a region on a charged surface at a first laser intensity for 0.1 seconds and a second latent dot may be formed using the xerographic process by the light source discharging a region on a charged surface at the first laser intensity for 0.2 seconds. The first and second regions may be discharged to different extents which may cause different amounts of ink or toner to adhere to the surface and thus to form the final image. This can affect the area covered by the ink or toner in the final image. Therefore the way in which the light source acts on the surface can affect dot gain.

In this specification the light source level is used to indicate how much light from the light source acts on the photoconductive surface. As discussed, this is related to the extent of change in charge distribution on the surface in regions where the light strikes and thus the amount of toner/ink which will adhere to the surface and is thus linked to the level of dot gain. Some other examples of how to vary the light source level received at the photoconductive surface are by operating the light source in different modes (e.g. power modes or scanning modes) for different periods of time, by operating the light source in bursts, by operating the light source at different intensity/power levels or by causing different amounts of light to act upon the surface in any other suitable way. If the light source is a laser one way of achieving a variation in the light source level is by laser power modulation or by laser pulse width modulation. Light acts on the surface by hitting the surface. Different amounts of light acting on the surface will cause different amounts of ink/toner to adhere to the surface in desired regions. Light source, in this specification can therefore be used to refer to, for example a laser, optics associated with the laser and scanning means, e.g. a polygon mirror associated with the laser, all in combination.

Optical Density (OD) is defined as the absorbance of light by a (printed) element and is defined as $$OD = \log_{10}\left(\frac{I}{IO}\right)$$

where IO is input light amplitude and I is output or reflected light. The OD of a print is dependent on the toner/ink thickness and on the coverage. For a solid patch where coverage is, by definition, complete the OD is dependent only on the toner thickness.

The common situation in Xerographic print that the final toner or ink thickness on the substrate (e.g. paper) and the area covered are determined by the latent image formed by the light source on the photoconductor and the interaction of the various voltage potentials driving the charged toner in the system. If the overall light amplitude is reduced the horizontal dimension (orthogonal to thickness) of the printed elements, or the coverage, will be largely reduced and the thickness of toner will be somewhat reduced. On the other hand if the voltage potentials are changed then the toner thickness will be largely changed and the coverage will be somewhat changed. Thus, normally, the thickness, resulting in Optical Density and the Dot Gain (DG) (which is a measure of the actual cover) are coupled and one may not change one without affecting the other. The color consistency of solid patches depends mainly on OD, while the width of graphic elements such as text/lines etc, depends mainly on the Dot Gain.

According to one aspect of the present invention, there is provided a method for decoupling the tuning of Optical Density (OD) from the tuning of Dot Gain (DG), both on a global basis (same dot gain across the page), and on a local basis where the dot gain is adapted to local image characteristics, e.g. to protect sensitive graphical elements such as small dots from print instabilities by locally modifying the dot gain.

Advantageously, accurate and consistent tuning of both Dot Gain and optical density is obtained in the same image. However, as FIG. 21 illustrates, the coupling of OD and DG can limit the possibility to obtain a desired Dot Gain value (e.g. zero) for a given OD value that is tuned for solid-patch color consistency.

The connection between ink thickness and printed object coverage/size is illustrated in FIG. 21, which displays the result of attempting to print a 3 pixel wide line. The curves 2001, 2002, 2003 are the 3 Gaussian shaped beams which, together, write the line (the height is in arbitrary units). The dashed 2004 and dotted 2005 curves are the resulting charge distributions on the photo-conductor (in arbitrary units) for two different power levels —the dashed curve 2004 represents a higher power level than the dotted curve 2005. The horizontal line 2006 depicts for a certain condition the development field indicating separation between foreground and background. Anything above the brown line will be background and anything below will be printed. The shaded box 2007 represents the boundary of the common variation in development field needed to compensate consumable variation. It will be noticed that the width for the lowest condition (represented by the arrow 2008) is much less than the width for the highest condition (represented by the arrow 2009). This shows that changing the ink thickness by changing the development voltage also changes the dot gain. The variation induced by changing the laser power is shown by the difference in size between arrow 2010 (dashed line (higher power)) and arrow 2011 (dotted line (lower power)), indicating a change in dot gain. Towards the bottom of the curves, arrow 2013 illustrates that the two curves 2004, 2005 have different depths indicating a difference in ink thickness when laser power is changed. Thus the laser power and developer voltage (field induced thereby) together affect and couple dot gain and ink thickness.

The central arrow 2012 represents the zero dot gain condition for the three pixel-wide line. Since the arrow 2012 does not touch the dashed (higher power) curve 2005 and in this typical case the curve 2005 represents the lowest allowable laser power before instability sets in, the zero dot gain condition is not accessible.

Moreover, for some system setting aimed to obtain certain OD values, small graphical elements such as small dots or narrow lines, may suffer from print instabilities if the dot gain is insufficient. Therefore it can be desirable to increase the dot gain for such elements ("protect" them), without modifying the overall OD which is already tuned for solid-patches.

According to another aspect of the present invention, there is provided a method to control the dot gain separately from optical density, by irradiating edge (or close to edge) dots differently from internal dots, since the dot gain is defined at the edges of the printed elements, and does not depend on internal dots. The provided method can bring the dot gain to a desired nominal value, in particular, zero dot gain.

According to another aspect of the present invention, there is provided a method to improve print stability, by locally adapting the dot gain according to local characteristics of the latent image, so that small graphical elements such as small halftone dots are printed in a stable fashion, i.e. always appear on the final print and preferably with a constant size.

According to another aspect of the invention, there is provided a dot gain compensation method for taking into account dot gain in a xerographic process which comprises converting a digital image comprising pixels into a latent image comprising dots using light from a controllable light source arranged to strike a photoconductive surface and change charge distribution on the surface to form the dots making the latent image on the surface, the digital and latent images each having an edge and comprising an edge pixel or edge dot respectively, which is at or near the edge, and a non-edge pixel or non-edge dot respectively, which is not at or near the edge, wherein the method comprises the step of identifying whether or not a dot to be formed is an edge dot and using a different light source level incident at the photoconductive surface when forming the edge dot compared to when forming the non-edge dot such that charge distribution is changed to a different extent when forming the edge dot compared to when forming the non-edge dot.

Preferably each pixel of the digital image has an associated instruction indicating a default light source level which should be used when forming its corresponding dot in the latent image, the method comprising forming the edge dot using a light source level different to the default light source level.

Preferably the light source acts differently by (i) operating for a different period of time, (ii) operating in different bursts, (iii) operating at a different intensity, (iv) scanning light across the surface at a different rate, or (v) causing a different amount of light to strike the surface when forming a dot in any other suitable way, or (vi) any combination of (i) to (v).

The edge dot identifying step may comprise the step of comparing a selected pixel and its neighbouring pixels to templates known to be indicative of an edge pixel to determine whether or not the selected pixel is an edge pixel.

Alternatively the pixel may have a tag identifying it as an edge pixel or as a non-edge pixel, the method comprising reading the tag to determine whether or not the pixel is an edge pixel.

Preferably the method includes the step of calibrating the action of the light source on the surface so that the light source forms the edge dot so as to provide a desired level of dot gain for an edge dot in a physical image produced by the xerographic process. Preferably the desired level of dot gain is substantially zero.

The method may comprise using a lower light source level when forming the edge dot than when forming the non-edge dot.

The edge dot may comprise a protected edge dot and the method comprises the step of identifying whether or not an edge dot to be formed is a protected edge dot and using the same light source level when forming the protected edge dot compared to if it were a non-edge dot or using a light source level which is not reduced to the same extent compared to if it were an edge dot which is not a protected edge dot.

The protected dot identifying step may comprise the step of comparing a selected pixel and its neighbouring pixels to templates known to be indicative of a protected edge pixel to determine whether or not the selected pixel is a protected edge pixel.

The edge pixel may have a tag identifying it as a protected edge pixel or as a non-protected edge pixel, the method comprising reading the tag to determine whether or not the edge pixel is a protected edge pixel.

The method may comprise the further steps of controlling the light source used in the xerographic process, the process comprising converting the digital image comprising pixels into a physical image comprising corresponding dots, the method arranged to achieve a desired light source level when forming edge dots such that charge distribution on the photoconductive surface is changed to a desired extent and achieve a desired level of dot gain in edge dots of physical images produced by the process, the light source being operable in a plurality of modes to produce differing levels of dot gain;

an optical ratio between two xerographically produced physical images being defined as a ratio of mean average optical densities of each image;

the method comprising using the xerographic process to produce a first physical image having a first mean average optical density and a first attribute which influences the mean average optical density of the image for a given level of dot gain and a second physical image having a second average optical density and a second attribute which influences the average optical density of the image for a given level of dot gain, the first and second physical images with their associated first and second attributes being such that at a particular optical ratio between the first and second physical images, the level of dot gain in the second physical image will be at the desired level, the method comprising adjusting the light source level to produce first and second physical images until they substantially provide the desired optical ratio between the xerographically produced physical images, and thereby establishing the desired light source level.

According to another aspect of the present invention there is provided a computer program product encoded with software code which when run on a processor of a xerographic machine causes a processor of the machine to instruct a light source of the machine to operate to cause a different light source level when forming edge dots of an image than when forming non-edge dots of the image in order to control dot gain in the xerographic process such that a desired final line width/dot size results in the image.

According to another aspect of the present invention there is provided a computer program product encoded with software code which when run on a processor of a xerographic machine causes a processor of the machine to control a light source of the machine to provide a desired light source level such that charge distribution on a photoconductive surface of the machine is changed to a desired extent and a desired level of dot gain in final images produced by the process is achieved, wherein the light source is operable in a plurality of modes to produce differing levels of dot gain;

an optical ratio between two xerographically produced final images is defined as a ratio of mean average optical densities of each image;

the processor is arranged to use the xerographic process to produce a first final image having a first mean average optical density and a first attribute which influences the mean average optical density of the image for a given level of dot gain and a second final image having a second average optical density and a second attribute which influences the average optical density of the image for a given level of dot gain, the first and second final images with their associated first and second attributes being such that at a particular optical ratio between the first and second final images, the level of dot gain in the second final image will be at the desired level, the processor further being arranged to adjust the light source level to produce first and second final images until they substantially provide the desired optical ratio between the xerographically produced final images, and thereby establishing the desired light source level.

According to a further aspect of the present invention there is provided a computer program product encoded with software code which when run on a processor of a xerographic machine is arranged to perform the steps caused by the computer program products of the above two defined aspects of the present invention.

According to another aspect of the present invention there is provided a method of making a xerographic machine, such as a printer or photocopier, comprising installing software code encoded on a computer program product according to any of the previously defined aspects of the invention on a control processor of an existing xerographic machine arranged to be able to run the software.

According to another aspect of the present invention there is provided a method of printing an image using a xerographic printer having a photoconductive substrate and a xerographic light source arranged to irradiate the photoconductive substrate in pixels, the amount of xerographic light falling on a pixel being influenced by a digital image representation of an image, the digital image having for each pixel at least one light control parameter which is used to control the amount of xerographic light which falls onto each pixel during the formation of a latent image on the substrate, the method comprising determining whether a pixel of the digital image is an edge pixel at the edge of a feature in the image and, pursuant to that determination, altering the amount of light that falls on the equivalent edge pixel of the latent image on the photoconductive substrate in comparison to the amount that would otherwise fall on a non-edge pixel which had the same pixel light control parameter(s) associated with it.

According to another aspect of the present invention there is provided a method of xerographically printing images comprising setting a desired dot gain for a xerographic printer or photocopier by comparing two print images having a different ratio of number of edge pixels to total number of pixels so as to establish what print control settings that influence the amount of light falling on pixels of a latent xerographic image are used to achieve a desired result of said comparing, and printing images using print control settings so established.

According to another aspect of the present invention there is provided a xerographic image producing machine comprising:

a photoconductive substrate adapted to produce a latent image to be produced;

a control processor capable of accessing a memory containing a digital reproduction of an image to be printed;

a light source;

the control processor being programmed to perform an evaluation of the digital representation to differentiate between pixels of a latent image to be produced on the substrate that are edge pixels at the edge of a feature in the latent image and pixels that are more central in features of the latent image than edge pixels and to modify an amount of light falling on pixels of the latent image pursuant to said evaluation.

According to another aspect of the present invention there is provided a method of forming a xerographic image from a digital image comprising pixels and associated light level control values adapted to control the amount of light incident upon latent image pixels, on a photoconductive substrate, associated with the digital image pixels, the method comprising illuminating latent image pixels which correspond to edge pixels at the edge of a feature in the image with a lower amount of light per unit area than is used for pixels with equivalent light level control values that are non-edge pixels.

According to another aspect of the present invention there is provided a method of xerographic printing using a xerographic printer having a photoconductive substrate upon which a latent image is formed from a xerographic light source and a digital image to be printed having colour intensity levels associated with pixels of the digital image, the method comprising determining if a pixel in the digital image is an edge pixel at the edge of a feature in the digital image, and pursuant to such a determination differentially modifying the exposure of latent image pixels on the photoconductive substrate dependent upon whether or not the latent image pixels correspond to edge pixels of the digital image.

According to another aspect of the present invention there is provided a digital image with edge pixels flagged as such with an "edge pixel" flag.

Further aspects of the invention are defined in the claims.

It should be appreciated that when an aspect of an invention is claimed or described as a particular category (e.g. as a method, system, data carrier, xerographic machine etc.) then protection is also sought for that aspect but expressed as a different category of the claim. For example the first aspect of the invention may also be expressed as a system, a xerographic machine, a method etc. For example a claim to a method may also be expressed as a xerographic machine capable of carrying out the method or a data carrier having software on it which instructs a processor to carry out the method.

BRIEF DESCRIPTION OF THE DRAWINGS

Embodiments of the invention will now be described, by way of example only, with reference to the accompanying drawings, in which:

FIG. 1 schematically illustrates a printer according to an embodiment of the invention;

FIGS. 2a and 2b show schematically digital images to be converted by the printer of FIG. 1;

FIG. 3 is a flow chart representing a dot gain compensation method according to an embodiment of the invention;

FIGS. 4a and 4b show images produced by the printer of FIG. 1;

FIG. 5a schematically illustrates a printing system, according to an embodiment of the invention, including the printer of FIG. 1;

FIG. 5b schematically illustrates a printing system, according to a further embodiment of the invention, including the printer of FIG. 1;

FIG. 6 is a flowchart illustrating a dot gain compensation method according to a further embodiment of the invention;

FIG. 8 is a Matlab routine suitable for carrying out the steps of the method of FIG. 7;

FIG. 9 illustrates templates (FIGS. 9a to 9i), which show how the Matlab routine of FIG. 8 works;

FIG. 10 is a flowchart illustrating an embodiment of a calibration process according to a further embodiment of the invention;

FIG. 11 is a flowchart illustrating a method for setting a level of a light source used in a xerographic process to a desired level according to a still further embodiment of the invention;

FIG. 13 schematically illustrates a xerographic system for carrying out a xerographic process including the process of FIG. 11;

FIG. 16 shows examples of images produced by a standard prior art xerographic process;

FIG. 17 shows examples of images produced by a xerographic process using a dot gain compensation method according to an aspect of the invention;

FIGS. 18a, 19a and 20a are examples of images produced using a standard xerographic process;

FIGS. 18b, 19b and 20b are corresponding images produced using a xerographic process including a calibration method according to an embodiment of the present invention.

DETAILED DESCRIPTION

Figure 7:
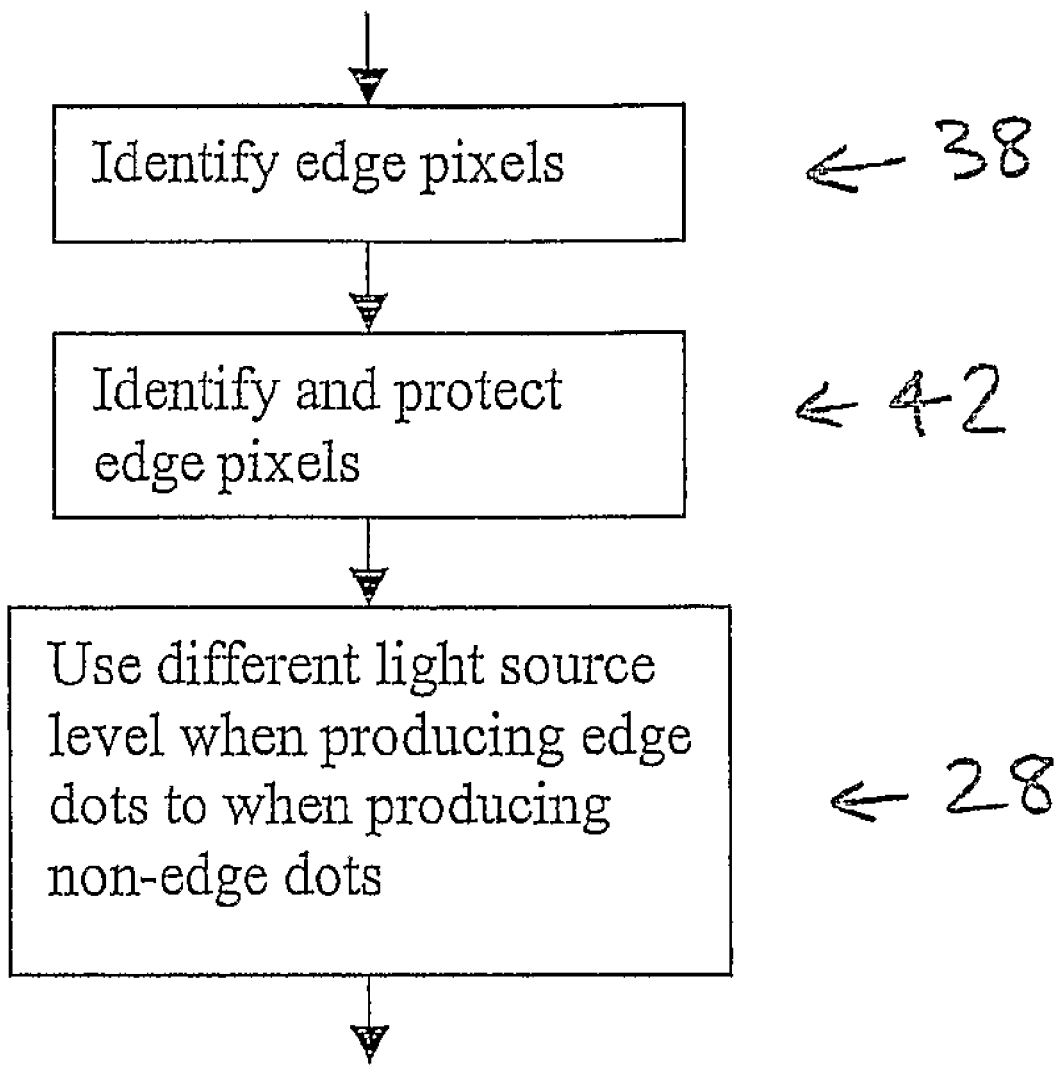
FIG. 7 is a flow chart illustrating a dot gain compensation method according to yet a further embodiment of the invention.

Referring to FIG. 1, in a first described embodiment of the invention, a xerographic machine in the form of a printer comprises a photoconductor 10 that generally forms the outer surface of a rotatable cylindrical drum. It will be appreciated that the invention is applicable to any xerographic process and in other embodiments the xerographic machine may be a digital printing press, a photocopier, a fax machine, a plate setter, a direct-to-film laser printer, a scanned laser display or any other xerographic machine. During the printing process the surface of the photoconductor 10 is uniformly charged with static electricity by, for example, a corona discharge 12. Portions of the photoconductor 10 are exposed to light 14 from a light source 15. In this embodiment the light source 15 comprises a laser in the form of an edge emitting laser. In other embodiments a plurality of such lasers may be used or different types of lasers may be used or any other light source that provides a suitable light source level for use in a xerographic process may be used. The drum is rotated so that the image to be printed is formed on the photoconductor 10. The light 14 discharges the charge on the drum in exposed areas and leaves a discharged latent image. The latent image is then developed by applying a toner 16, such as a dry powder ink, or a liquid electroink toner (e.g. as in LEP printing) or a pigmented dry powder toner, over the surface of the photoconductor 10. The ink or toner 16 adheres to the discharged areas of the photoconductor 10 so that the latent image becomes visible. The toner 16 is then transferred from the photoconductor 10 to a sheet of paper 18, or in other embodiments to some other suitable medium, to support the printed image. A fuser 20 may be used to fix the image to the paper 18 by applying heat and pressure, or pressure alone, to the toner 16 on the paper 18. The direct-to-paper transfer system shown in FIG. 1 represents only a subset of xerographic printers. Many xerographic printers use an intermediate transfer drum or belt to receive the toner image from the photoconductor and apply it to the print medium. Some printers have no separate fuser, and the fusing process occurs during the transfer from the intermediate transfer drum to the paper.

The light source 15 is arranged to receive instructions regarding an original digital image, which is required to be reproduced in the xerographic process. In this embodiment the light source operates by scanning light across the surface of the photoconductor 10. The instructions provided to the light source 15 indicate which regions of the photoconductor 10 should be exposed to light 14 and the amounts of light 14 which should strike each region that is to be exposed. In this embodiment a printer controller 22 in communication with the light source 15 provides these instructions.

The apparatus shown in FIG. 1 can be used to reproduce digital images such as 23a, 23b (see FIGS. 2a and 2b) using a xerographic process in which a dot gain compensation method (see FIG. 3) is employed. The digital images 23a, 23b are made up of pixels and have edges 19. Each pixel of a digital image has a value of 0 or 1 in this embodiment to indicate whether it is blank or non-blank respectively (e.g. if not black, the pixels are in the digital image all the same shade of black). FIGS. 4a and 4b show final images 25a, 25b produced by the xerographic process resulting from conversion of the digital images 23a, 23b respectively. The final images 25a, 25b comprise edge dots 26 at their edges and non-edge dots 34 which are not at their edges. The digital image has corresponding edge pixels 21 and non-edge pixels 23. In this embodiment an edge dot 26 is defined as a dot which has at least one neighbouring blank dot, where 'neighbouring' can have various meanings, such as 4-connectivity (i.e. connected along sides of the pixel), 8-connectivity (i.e. connected along sides or diagonals of the pixel), 'double-layer'-connectivity (i.e. connected by at least two consecutive layers of black pixels) etc. When the digital image 23a is converted into its corresponding final image 25a pixels with a value of 1 correspond to a dot and pixels with a value of 0 correspond to no dot in the final image. This is a binary black and white printing operation—other colours may be used in other embodiments. Also in other embodiments where the resolution of the binary source image is not equal to the native resolution of the printing system, the source image is first represented in the native resolution as a multi-level (partial-exposure) image, i.e. a greyscale image. In this case, there are many possible edge criteria that can be used, e.g., threshold the image and use the criteria as above, threshold the local differences between neighbouring pixels, etc.

In use when the light source 15 is arranged to act on the surface of the photoconductor 10 to produce a non-blank dot, it operates at a first level if the dot to be printed is a non-edge dot. In this embodiment when the light source 15 acts at the first light source level on the surface of the photoconductor 10, the xerographic process produces a final image having dots of a desired, default optical density by operating the laser at 100% of the intensity required to produce a black dot (i.e. a dot having a greyscale value of 255). Referring to FIGS. 3, 4a and 4b, when producing the edge dots 26 in the final image, the light source 15 produces corresponding edge dots in a latent image formed on the surface of the photoconductor 10. Edge dots in the latent image are formed by the light source 15 acting at a light source level which is different to the first light source level. In this embodiment the light source level used to produce the edge dots of the latent image is lower than the default light source level since it is assumed that dot gain is positive and the system is set up accordingly.

The light source level may be reduced relative to the first light source level by providing instructions to the light source 15 to produce an edge dot in the latent image using less light 14 than when producing a non-edge dot. In this embodiment this is achieved by operating the laser at 60% of the intensity required to produce a black dot (i.e. 60% of the intensity required to produce a dot having a greyscale value of 255). In other embodiments this may be achieved by operating the laser 15 at a lower intensity, operating it for a shorter period of time, operating it in bursts for a shorter period of time or increasing scan speed of the laser across the surface of the photoconductor 10 so that it provides less light exposure to each irradiated dot for example. Step 28 shown in FIG. 3 illustrates this dot gain compensation method.

In this embodiment it is known or expected that dot gain is positive and so the light source 15 is instructed to operate at a reduced light source level when acting on the surface of the photoconductor 10 to produce dots in the latent image corresponding to edge dots 26. However in other embodiments if it is known or expected that dot gain is negative then the light source may be instructed to operate at a light source level different to the first light source level which is increased relative to the first light source level when producing edge dots in a latent image corresponding to edge dots in a final image.

As an example the light source level may be reduced to between 0% to 99% of the default light source level when producing edge dots. For example it may be reduced to about 50% intensity of the default intensity or it may operate for less time than at the default level e.g. for a third of the time (but at the same intensity), or a combination of different intensity and different time.

In other embodiments, edge dots may be printed using a first light source level and non-edge dots are printed using the different light source level.

Referring to FIG. 5a, in some embodiments the printer controller 22 is arranged to receive instructions from a computer processor 36 of a remote computer. The computer may be a PC for example and communication between the computer processor 36 and the printer controller 22 may be via a parallel port or a USB port for example. In this embodiment the computer processor 36 provides instructions to the light source 15 via the printer controller 22 on how it should act on the surface in order to form the latent image. In other embodiments the printer controller 22 itself may generate and provide these instructions. In some embodiments (as illustrated in FIG. 5b) the instructions are provided in real time i.e. as light 14 from the light source 15 is being scanned across the surface of the photoconductor 10. In other embodiments the instructions may be provided as a set of instructions for an entire print job or for sections of a print job and these instructions can be executed when desired. In some embodiments, the instructions are stored in a memory module 37. In different embodiments, the memory module can be the memory module of a remote computer or a memory module associated with the printer or a memory module such as a data carrier (CD, floppy disc etc.).

The instructions in the form of the digital image may be a pdf, gif tiff, bitmap file or in any other suitable format.

Referring to FIG. 6 in a further embodiment the dot gain compensation method, included as part of the xerographic process, includes at step 38 the step of identifying edge dots. In this embodiment it is not necessary to have the edge dots pre-identified. Instead the printer controller 22 is arranged to run software 40 which enables it to identify edge dots 26 to be printed at a light source level different to the light source levels used to print non-edge dots. At step 38 the printer controller 22 is able to examine an original digital image which is to be produced by the xerographic process in digital form—the image comprises pixels. In some embodiments the original image is provided in digital form initially and in other embodiments the original image may not be in digital form but may be converted to digital form before being processed by the printer controller 22. For example a raster image processor may be used to provide the image in a suitable form for the printer controller 22 to process.

Each pixel making up the digital image is assessed in order to determine whether or not it is an edge pixel 21 which will eventually correspond to an edge dot 26 in a final image produced by the xerographic process. One way of doing this is to check whether a pixel or group of pixels matches a pre-defined template known to correspond to a template for an edge pixel. In this embodiment the printer controller 22 carries out this template-matching step. Examples of templates used in other embodiments are provided below. In other embodiments different methods may be used in order to identify edge dots 38. In different embodiments edge dots can be defined differently. Edge dots are whatever a software algorithm defines them as. For example, in some embodiments an edge pixel can be a pixel which differs in greyscale value by greater than 230 (in a 0 to 255 greyscale system) compared to its neighbouring pixels. In other embodiments an edge pixel may be a pixel having a different predefined colour difference with an adjacent pixel.

In some embodiments the light source may be arranged to act differently on the surface for edge dots and dots near the edge compared to dots which are not near the edge i.e. a first light source level is used to produce dots which are not near the edge and a different, second light source level is used to produce dots which are at or near the edge. For example when the printer controller 22 is identifying any edge dots at step 38 it may also be arranged to identify dots near the edge for subsequent different laser exposure. Considering an image formed of pixels where each pixel can have a value of 1 (a non-blank pixel) or 0 (a blank pixel), then an edge pixel can be defined as a non-blank pixel with at least one blank pixel next to it. In some embodiments it may be considered that a pixel which is diagonally adjacent another pixel is next to the pixel and in other embodiments it may be considered that only pixels which are alongside other pixels are next to those pixels. In embodiments in which pixels which are near the edge of the image also need to be identified, pixels which are one, two, three or more pixels away from the actual edge of the image may be identified as being near to the edge. Different types of edges may be, for example, different shapes, greyscales, colours, shades or any other suitable distinguishing feature. For example an edge may be defined as a boundary between blue and red pixels.

In this embodiment, the pixel distance from the actual edge for which a pixel is identified as being near to the edge needs to be small enough so that the change in perceived shade or optical density will not be noticeable. As indicated above alternatively or additionally to the embodiment disclosed in FIG. 6, the tagging of edge pixels may already be provided for in the original image or may be done by the printer controller 22 or by a raster image processor or by processing of an image which has been processed by the raster image processor e.g. by template-matching. When pixels are pre-tagged as edge pixels, the light source level to be used to print the pixels is predetermined in some embodiments and in other embodiments it is calculated on the fly during the printing process. In some embodiments non-edge pixels are tagged as being non-edge pixels instead of tagging edge pixels in order to differentiate between edge and non-edge pixels.

In many print jobs the requirement is to reduce dot gain since an area covered by a dot produced by a xerographic process is greater than an area in a corresponding dot/pixel of an original image. Therefore for some pixels, e.g. some small dots, thin lines, diagonal connections etc. it is not actually desirable to reduce dot gain to the extent provided by the light source acting in the non-default manner. Therefore referring to FIG. 7, in some embodiments of the invention the dot gain compensation method used in the xerographic process includes an additional step 42 of protecting vulnerable (or unstable) pixels. This step 42 may be carried out after identifying edge pixels at step 38 or before identifying edge pixels or at the same time as identifying edge pixels. At step 42 the printer controller 22 identifies vulnerable (unstable) pixels and is arranged to protect them by not subjecting their corresponding dots in the latent image to a reduced light source level during the xerographic process or at least not reducing the light source level to the same extent as for other edge dots which are not identified as being vulnerable.

Vulnerable pixels are any pixels which can be identified as being pixels which correspond to dots in the latent image which if exposed to a light source level, would make the image unclear or unstable. Referring to FIG. 8 an example of software 40 in the form of a Matlab routine run by the printer controller 22 in order to identify and protect the vulnerable pixels and identify edge pixels is shown.

Referring to FIG. 9 an illustration of the effect of the Matlab routine is provided. Matlab is a programming language which is a proprietary product of the MathWorks. The Matlab routine causes the printer controller 22 to examine each pixel of the original digital image by considering each pixel as a central pixel in a group of nine pixels in a three by three square of pixels. Pixels surrounding the central pixel are then examined to determine whether the central pixel is a particular type of pixel e.g. an edge pixel. In this Matlab routine the step 42 of identifying and protecting vulnerable pixels occurs before the step of identifying other, non-vulnerable edge pixels. Each group of nine pixels is compared to a set of templates sequentially in order shown in order from FIGS. 9a, 9b, 9c, 9d, 9e, 9f, 9g, 9h to 9i. Each template comprises nine pixels, each pixel being assigned a value of 1 to indicate the presence of a non-blank pixel in the original image, a value of 0 to indicate the presence of a blank pixel in the image and a value of neither 1 nor 0 to indicate the presence of either a blank or a non-blank pixel in the image. The set of templates shown in FIGS. 9a to 9i are suitable for firstly checking for a solid pixel (i.e. one which is non-blank and completely surrounded by non-blank pixels). If a selected pixel being examined is identified as a solid pixel, i.e. as a non-blank, '1' pixel surrounded completely by non-blank, '1' pixels, the printer controller 22 instructs the light source 15 to act at a first default level when producing a dot corresponding to the pixel. This is because a solid pixel is not producing an edge dot in the final image. Next, the templates shown in FIGS. 9b and 9c are used to identify vulnerable pixels which are either a single pixel or parts of a thin diagonal. These pixels are edge pixels but are identified as being vulnerable and therefore in this embodiment there is no change in laser power from the default level when producing a dot corresponding to the central vulnerable pixel. In other embodiments they may induce some changes in laser power but not to the same extent as pixels which are edge pixels that are not vulnerable. For example normal edge pixels may be produced at 50% of default laser intensity whereas vulnerable pixels may be produced using 90% of default laser intensity, for example.

In this example pixels have a value of 1 or 0 in the original digital image. In other examples the pixels may originally have a greyscale value of between 0 and 1023 for example. In this case, vulnerable edge pixels, non-vulnerable edge pixels and solid pixels can be produced at the above-mentioned percentage multiples of their individual assigned greyscale values, e.g. a normal edge pixel having a greyscale value of 100 would effectively be produced at a greyscale value of 50 (if produced at 50% of default laser intensity).

Once a template match is provided for a particular pixel being examined, the pixel in question is not checked against the rest of the templates in the sequence. The templates shown in FIGS. 9d to 9g correspond to diagonal connections which provide edge pixels but also have at least one neighbouring, non diagonal, non-blank pixel. These are edge pixels but they are not vulnerable and so dots corresponding to the central pixel in the templates are produced using the non-default, reduced light source level. The templates shown in FIGS. 9h and 9i correspond to non-blank pixels which are parts of horizontal or vertical connections and so are edge dots which are not vulnerable. These are also printed with a reduced light power level.

In other embodiments different template matches may lead to different light source levels being used for e.g. different types of edge pixel such as those shown in FIGS. 9d and 9g.

It will be appreciated that instead of a reduced laser power level the laser may be operated at the same power but for a shorter duration of time or may be otherwise operated to act differently, e.g. the scan speed may be changed, in order to provide less light exposure when forming a dot required to be formed at the reduced level.

It will also be appreciated that different levels of vulnerability for pixels may be provided so that different light source levels may be assigned for producing dots of differing degrees of vulnerability.

In other embodiments vulnerable edge pixels may be pre-identified e.g. by tagging them (similarly to how edge and non-edge pixels are tagged in some embodiments).

Advantageously, in cases where dot gain is negative and the dot gain compensation method of this invention is employed in a xerographic process to provide an image in which edge dots are provided at a non-default, increased level, then the final image produced by the xerographic process is clearer than if the compensation method is not employed.

Advantageously, if dot gain is positive and the compensation method of the present invention is employed to reduce the light source level when producing edge dots in the final image, the final image is also made clearer. In this case, for example if there is a narrow blank gap between non-blank regions of an image, if the compensation method were not to be applied then it is possible that the gap may be totally or substantially or at least partially closed due to the effects of dot gain whereas when the compensation method of the present invention is employed this effect is reduced or eliminated altogether.

Referring to FIG. 10 in some embodiments of the present the dot gain compensation method further includes, or alternatively includes, a step 44 of calibrating the action of the light source 15 on the surface of the photoconductor 10 during the xerographic process so that the light source 15 forms the edge dot 26 to provide a desired level of dot gain. In this way more control is provided over the level of dot gain for edge dots in a final image. It is not merely reduced or increased relative to dots produced by the default light source level, but can be controlled. Following the calibration step the printer controller has information regarding the light source level required to achieve a desired dot gain in a particular xerographic process and can use this particular light source level on producing edge dots 26 at step 28. Advantageously, the calibration step allows the light source level to be calibrated for a particular xerographic process so factors such as the amount of charge on the photoconductor 10, the amount of charge on the toner 16, the properties of the substrate 18 etc. are taken into account during the calibration process. A suitable calibration process is described in detail below.

A preferred level of dot gain to be achieved is desired, and may be zero or substantially zero so that a final image produced by a xerographic process is as close as possible to an original image which is intended to be produced by the process. Alternatively it may be required to provide a required, predictably controlled, non-zero level of dot gain. This may be useful in situations, for example, where some fonts in printing applications are pre-designed to account for a certain level of dot gain and the appearance of the final image will most closely match the intended appearance of the original image if a pre-determined level of dot gain is present in the xerographic process producing the image.

Referring to FIG. 11, a suitable calibration process for regulating the operation of a light source used in a xerographic process so as to produce a desired light source level in order to achieve a desired level of dot gain in images produced by the process is illustrated. This process is applicable, for example, at step 44 of FIG. 10. Alternatively it may be employed in a distinct xerographic process in which edge dots are not required to be printed at a non-default light source level.

The apparatus shown in FIG. 1 for carrying out the xerographic process is suitable to carry out this calibration process. The light source 15 is operable in a selected one of a plurality of modes of operation so as to produce a plurality of different levels of dot gain in a final image produced by the xerographic process corresponding to each mode of operation. An image produced by the process will have a certain average optical density (equivalent to mean optical density) which can be measured by how dark or light a particular image is. The optical density of an image will be dependent upon the amount of light that can pass through the image and in a particular xerographic process it will be dependent upon the amount of toner on a substrate upon which the image is provided, for example. The optical density can thus provide a measure of the dot gain since the amount of toner upon the substrate is linked to the dot gain present when printing images by the xerographic process. A measure of the optical density can be provided by measuring the amount of light that can pass through the image on the substrate or by measuring the amount of light that is reflected from the image on the substrate.

An optical ratio between two images is defined for the purposes of this specification as a ratio of the average optical densities of each image. Images produced by the xerographic process also have attributes which affect the average optical density of the image for a given level of dot gain (i.e. at a particular light source level).

The calibration process 48, at step 50, comprises the step of providing first and second images having desired attributes to be produced such that, at a particular optical ratio between the first and second images, the level of dot gain in the second image would be at the desired level.

At steps 52 and 54, first and second images respectively are produced. The first image provided at step 50 has a first average optical density and an attribute which affects the average optical density of the image for a given level of dot gain. The second image provided at step 50 has a second average optical density and an attribute which affects the average optical density of the image for a given level of dot gain.

At step 55 the calibration process 48 comprises the step of testing the first and second images to check whether they substantially provide the desired optical ratio and thus indicate the desired light source level. If they do not then at step 56, the light source level is altered and the process 48 is recommenced at step 52 so that more images are produced until the desired optical ratio is reached. If, or when, after step 55, the first and second images provide substantially the desired optical ratio, then the desired light source level (i.e. that which produces the desired dot gain) is found (step 57).

Advantageously, the light source level using the xerographic process can then be controlled to print some or all of an image or parts of an image. The calibration process can be redone whenever any element of the xerographic process which may affect dot gain changes—for example when a substrate upon which an image is being produced is changed or when a toner is changed or periodically to account for factors which change over time e.g. charge density of the surface of the photoconductor. The calibration process can be carried out for example when there is a predefined degree of change in a factor or factors affecting dot gain. For example the calibration process can be carried out at predetermined time intervals or after a predetermined amount of toner is used.

Figure 12:
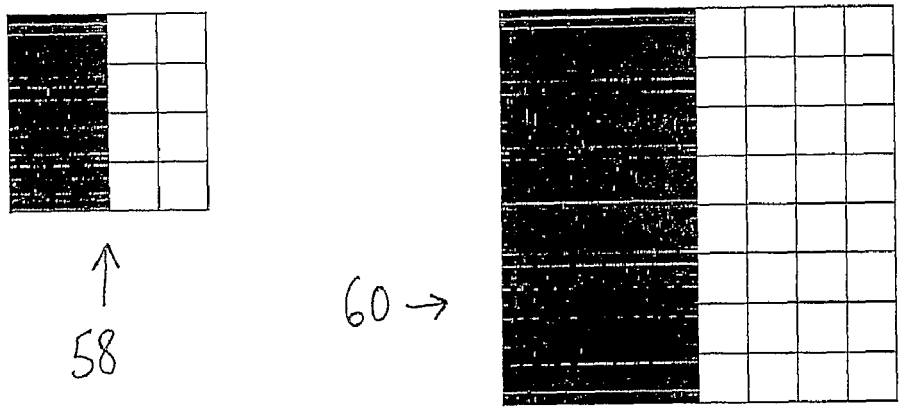
FIG. 12 schematically illustrates examples of digital images converted during the process of FIG. 11.

In some embodiments, the attributes at step 50 which are provided are ratios of the edge dot density to the total dot density for each image to be produced, i.e. the ratio of the area covered by edge pixels in an image to the area covered by all pixels in the image. For example, if it is desired to produce a xerographic process in which the dot gain is zero, the light source level used to produce the first image at step 52 is kept the same as the light source level used to produce the second image at step 54 is kept the same during the adjustment step 56. Referring to FIG. 12, the first image 58 is an image to be printed comprising a repeating pattern of vertical blocks of pixels in a "2 on-2 off" configuration, i.e. two columns of pixels are non-blank and two are blank in a repeating unit of four pixels. The second image 60 comprises a 4 on-4 off repeating pattern (and the edge dots make up a different fraction of the overall area of printed area). At step 50 these repeating patterns are provided for the first and second images to provide a specific ratio of edge dot density to total dot density for each image such that when the optical ratio between these images reaches one at step 56 (by adjusting the light source level until this optical ratio is reached) then a dot gain of zero will be achieved in the images. So, initially at step 50 the attributes (i.e. the forms of the repeating patterns) are set as indicated above. At steps 52 and 54 the first and second images are produced. At step 55 the images are tested to determine the optical ratio between them. If this is not at the desired level (one in this embodiment), the light source level is adjusted and more images are produced and tested. This process is repeated until a pair of images is produced having an optical ratio of substantially one. This indicates a dot gain of zero in the images produced at that light source level (for reasons explained below).

This is because the average optical density of the first image 58 can be expressed by the formula $(2+2D_1)/4$. The first '2' in this formula represents the fact that within each repeating unit there are two non-blank pixels, the second '2' in the formula represents the fact that there are two edges in each repeating unit and $D_1$ is a measure of the dot gain at each edge (each edge pixel will occupy an area of not only "1" unit, but also $D_1$, the dot gain area). The '4' in the formula represents the fact that each repeating unit is four pixels wide, and is necessary in order to indicate the average optical density. Similarly the average optical density of the second image 60 can be expressed as $(4+2D_1)/8$ since in each repeating unit there are four non-blank pixels, two edges, a dot gain $D_1$ for each edge pixel which is the same as the dot gain in the first image 58 (because the same light source level is used to produce both the first and second images 58, 60) and there are eight pixels in each repeating unit. It will be appreciated that although there is a dot gain $D_1$ associated with "middle", non-edge, pixels it does not actually increase the area covered by the pattern since it spreads onto an adjacent pixel that is already dark.

At step 56 the light source level is adjusted to produce images which have an optical ratio of one, i.e. the average optical density of the first image 58 is the same as the average optical density of the second image 60. This is because when the optical ratio is one, $D_1=0$, i.e. the dot gain is at the desired level of zero. In this way the light source level required to produce a dot gain of zero using the xerographic process is determined. In some embodiments, an operator can manually check whether the first image 52 is as dark as the second image 54 which would indicate an optical ratio of one (i.e. they can visually inspect the printed images and use their skill and judgement to assess them). In some embodiments the optical ratio may be required to be one or close to one within specified limits (e.g. the limits of human observance). In other embodiments the optical ratio may be machine-determined, for example automatically determined by a machine and, similarly, may be required to be close to a desired amount within a predetermined limit.

The skilled person can see that whilst the digital coverage is kept the same between the first and second images, the ratio of edge to non-edge pixels can be varied to calibrate for zero dot gain.

FIG. 13 shows a xerographic system capable of employing the calibration process 48, the system comprising the apparatus of FIG. 1 represented by reference numeral 62 and a measuring device 64. The measuring device 64 may be part of the printer in some embodiments or may be provided separately. The measuring device 64 may be a scanner for measuring the optical density of the first and second images for example. In other embodiments the measuring device can be any instrument suitable for measuring optical density—for example, a sensor or an optical densitometer. The measuring device 64 includes a processor 65 capable of communicating with the printer controller 22 in order to provide information to the printer controller 22 regarding the optical ratio between a pair of images produced by the xerographic process. Alternatively the processor 65 may provide information only on the optical densities of each image produced by the xerographic process and the printer controller 22 may itself determine the optical ratio. If the optical ratio is determined by the printer controller 22 (either itself or by being informed by the processor 65) that the optical ratio between two images is not at a desired level or not close enough to a desired level then at step 56, further pairs of images are produced until the desired optical ratio is reached. Therefore in this embodiment the step of measuring optical densities and hence the optical ratio is automatic, i.e. there is no human input required. As previously described, in other embodiments this step can be performed manually instead. In other embodiments a combination of manual and automatic measuring can be employed.

Figure 14:
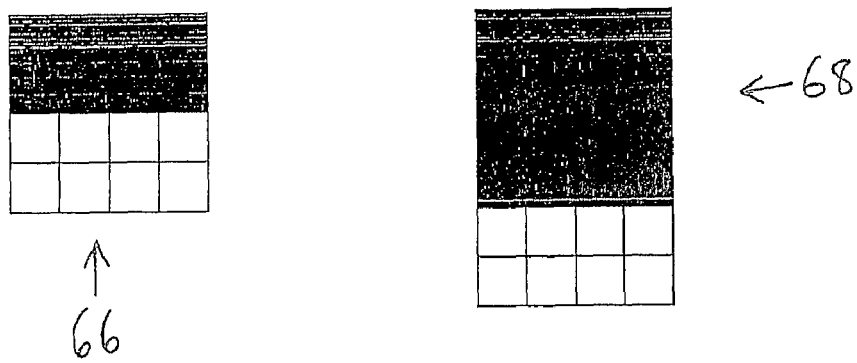
FIGS. 14 and 15 schematically illustrates examples of digital images converted during the process of FIG. 11.

FIG. 14 shows an example of a third image 66 and a fourth image 68 which can be used to set a non-zero dot gain level using this calibration process 48. In this case the third image comprises a repeating 2 on-2 off horizontal line pattern and the fourth image 68 comprises a horizontal 4 on-2 off pattern. In this case the light source level used to produce the third and fourth images 66, 68 is the same again. The average optical density of the third image 66 is $(2+2D_1)/4$ and the average optical density of the fourth image 68 is $(4+2D_1)/6$. Using the same process as previously described, when the optical ratio is one, a dot gain level of one (i.e. one pixel width) is achieved. Therefore this combination of patterns can be used to set a light source level to achieve a dot gain of one.

It can also be used to set a light source level at different dot gains. For example if the desired optical ratio at step 56 is set to three, i.e. the average optical density of the third image 66 is three times as much as the average optical density of the fourth image 68 then the light source level used to produce the dot gain which provides the desired optical ratio will be producing a dot gain of minus three. So if this particular dot gain is required then the third and fourth images 66, 68 can also be used. It will be apparent that various different geometries can be used to provide various dot gain levels. It will also be apparent that the optical ratio does not need to be an integer: it can be any number.

Figure 15:
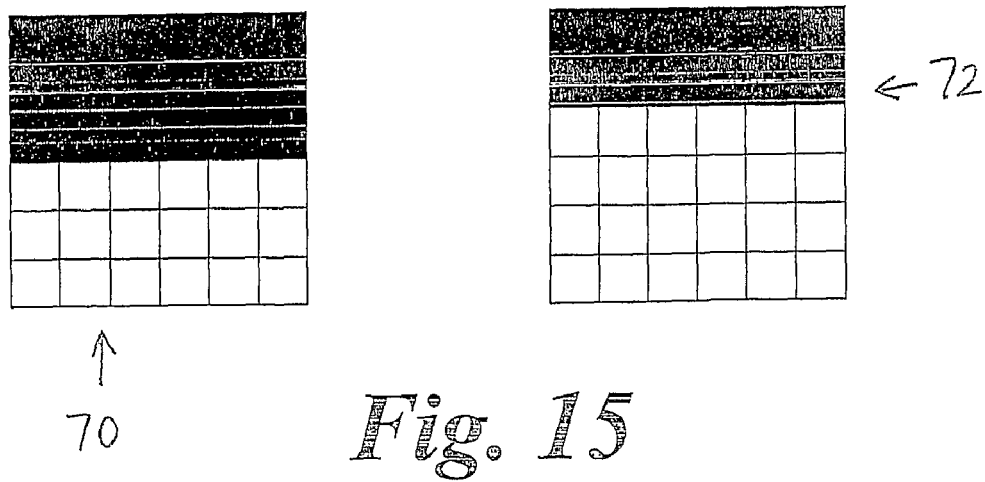

FIG. 15 shows a fifth image 70 and a sixth image 72. The fifth image comprises a 3 on-3 off horizontal repeating pattern produced at a light source level providing a first dot gain $D_x$. The average optical density of the fifth image 70 is therefore $(3+2D_x)/6$. The sixth image comprises a 2 on-4 off horizontal repeating pattern produced using a light source level which produces a dot gain $D_y$ and therefore the average optical density of the sixth image is $(2+2D_y)/6$. It is known that $D_x=0$, i.e. the fifth image 70 is produced using a light source level which produces zero dot gain. Therefore if it is desired to find the light source level which will produce a dot gain of 0.5 line width, i.e. $D_y=0.5$ then the desired optical ratio which is required to be found at step 56 of the calibration process is one i.e. when the fifth and sixth images, 70, 72 are as dark as each other then the light source level used to produce the sixth image 72 will be the light source level which produces a dot gain of 0.5 for that xerographic process. It will be appreciated that different patterns can be used and different optical ratios can be used to determine the light source level required to produce a particular dot gain in the second of a pair of images when the dot gain present in the first of the pair of images is known.

In other embodiments, the printer may print a series of first and second images and the optical ratio can be calculated (in a manner as previously described) for each pair of images. If a desired optical ratio is found, a desired light source level is established. If not, further pairs of images can be printed to arrive at the desired ratio. Alternatively, in other embodiments, the pair of images which provides an optical ratio closest to the desired optical ratio may be used to indicate a suitable light source level. This may be useful, for example, if it is not possible for a light source level to operate at a level to produce the desired ratio and instead the most extreme operation mode closest to the desired level is used.

It is also possible in some embodiments to calibrate for particular types of edges. For example when calibrating to provide a desired level of dot gain at a diagonal edge or a circular edge the calibration process may be applied to pairs of images having repeating patterns in forms which more closely match those edges. For example when calibrating for a diagonal edge, a pair of images comprising a diagonal shape or shapes may be used to calibrate the xerographic process.

Referring to FIG. 16, examples of images produced using a known xerographic process are shown. Similarly FIG. 17 shows images produced using a xerographic process including the dot gain compensation method of FIG. 3.

Figure 18A:
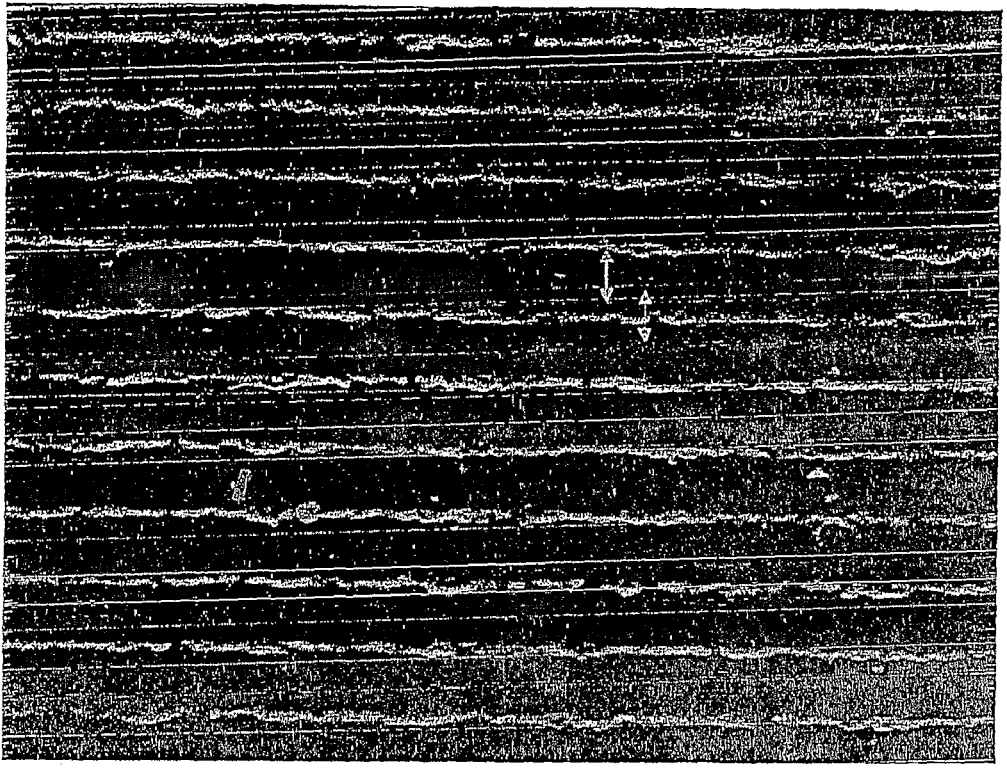

Referring to FIGS. 18a and 18b, examples of a 2 on-2 off repeating horizontal pattern are shown having been produced by a standard xerographic process and by a xerographic process employing the calibration process 48 of the present invention respectively.

Figure 19A:
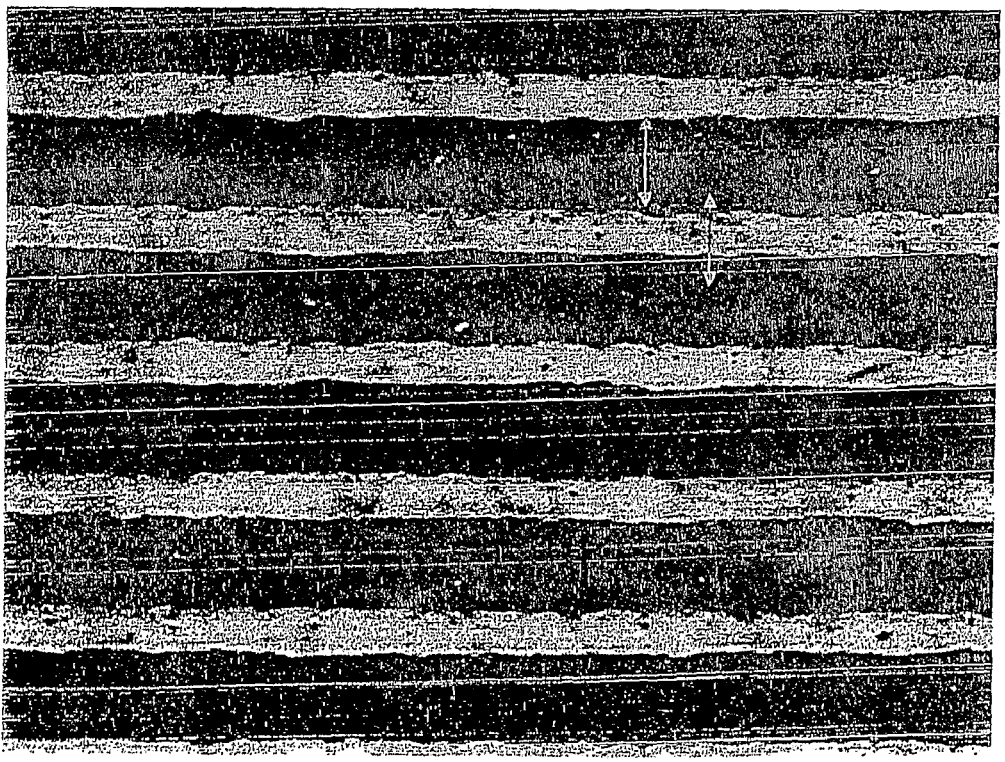
Figure 18:
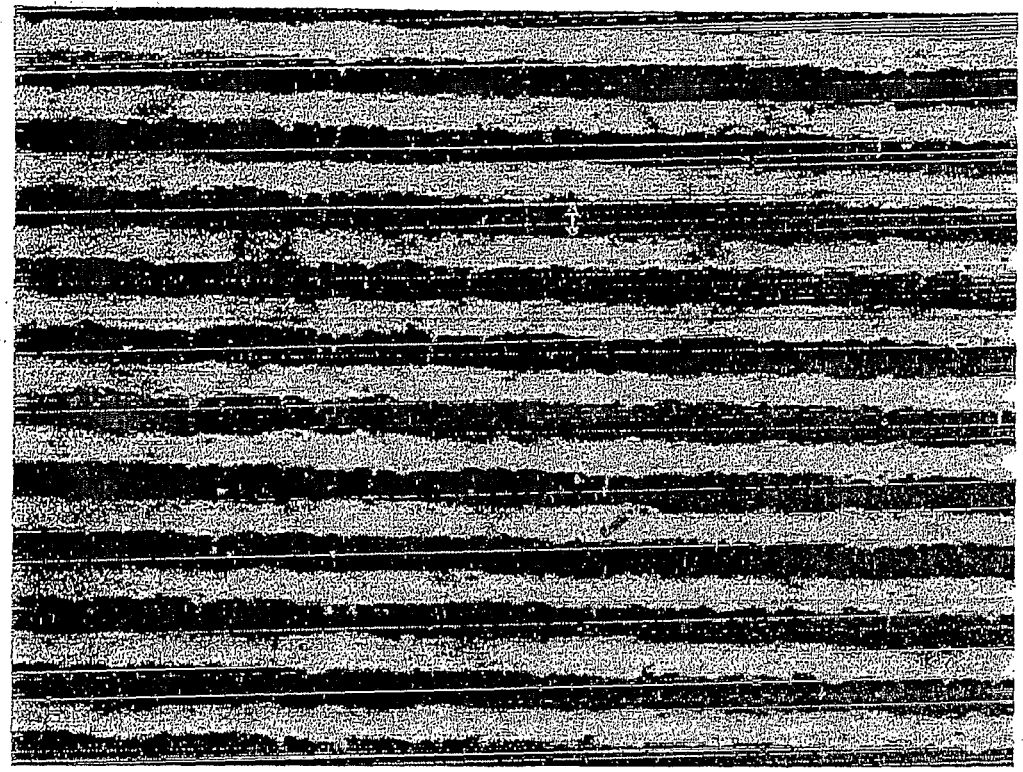
Figure 19B:
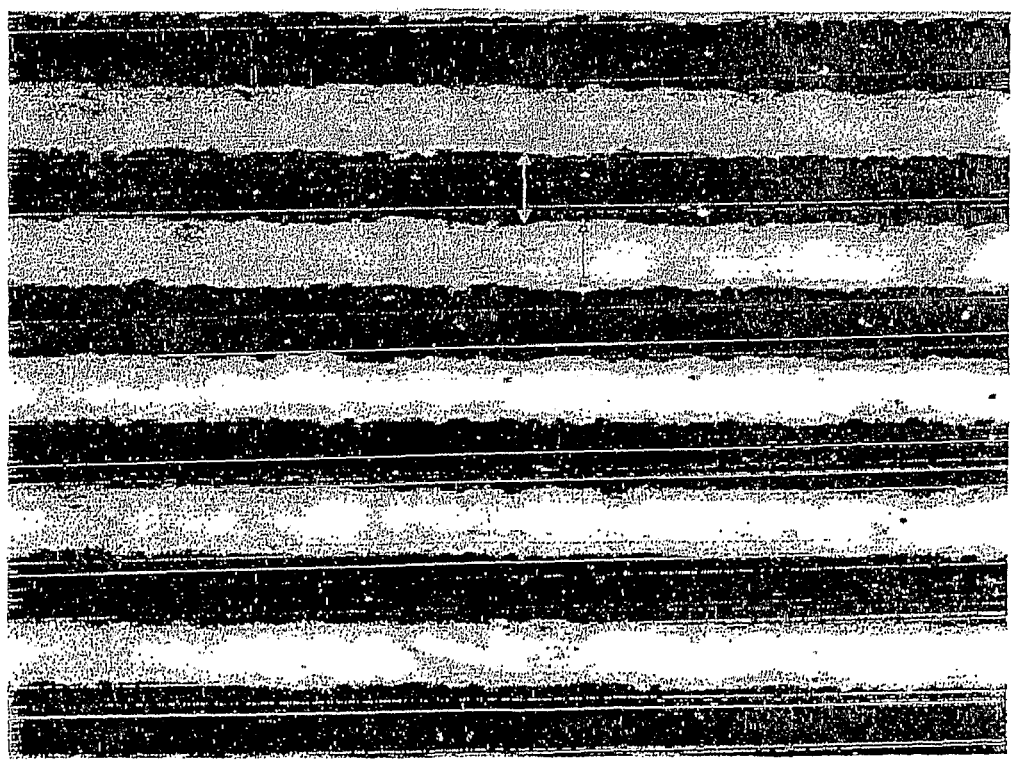
Figure 21:
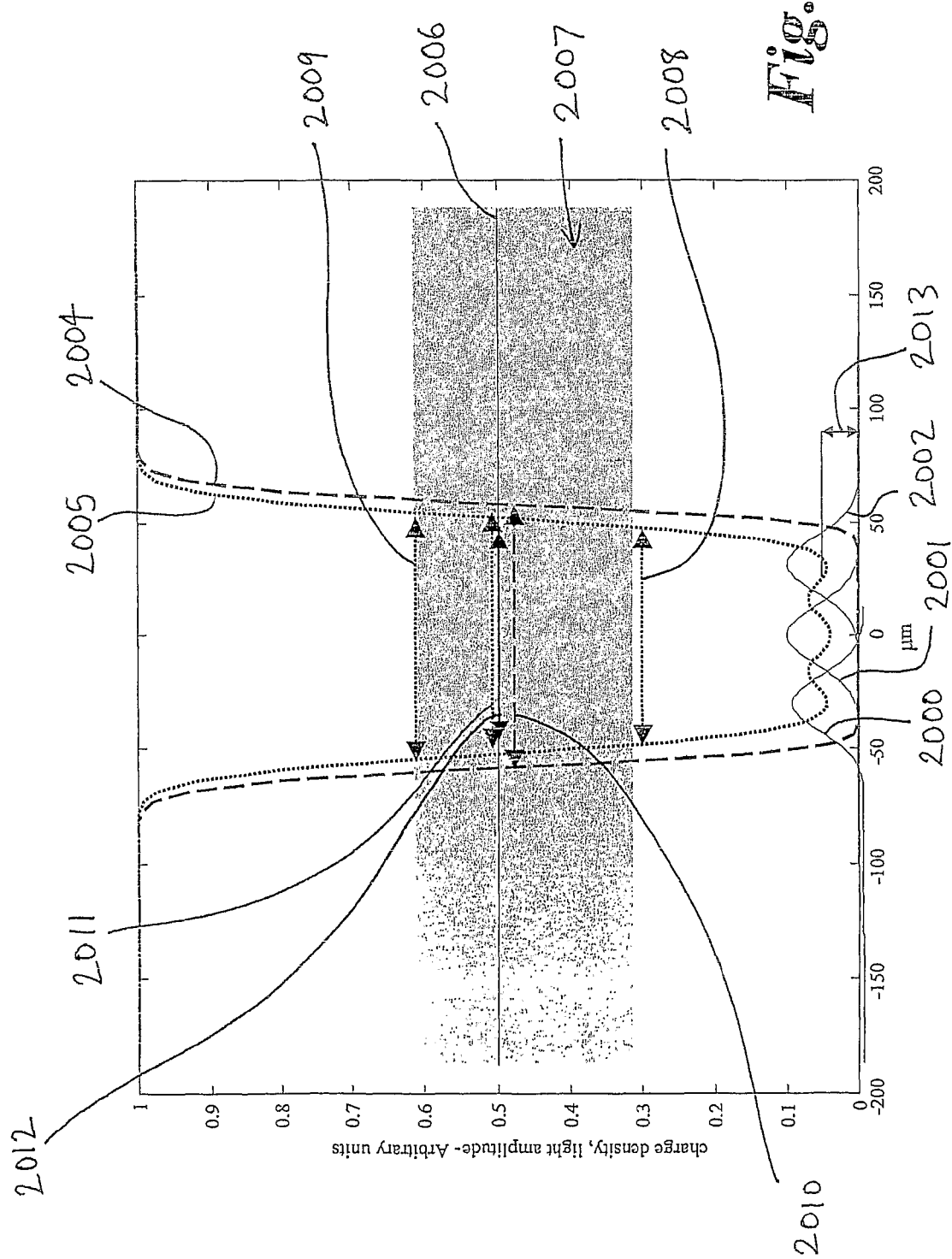
FIG. 21 is a schematic illustration of the attainable DG range as a function of OD and illustrates that there are OD values that do not permit a zero DG.

Referring to FIGS. 19a and 19b, images comprising repeating 4 on-4 off patterns produced by a standard xerographic process and a xerographic process including the calibration process 48 of the present invention respectively are shown. Referring to FIGS. 20a and 20b, images comprising an "8 on-8 off" repeating pattern formed using a standard xerographic process and a xerographic process including the calibration process 48 of the present invention are shown. From these Figures it is apparent that the processes of the present invention provide clearer final images and images which more closely represent images intended to be produced by a xerographic process than standard xerographic processes.

The invention claimed is:

1. A method to decouple the control of dot-gain and optical density in electro-photographic based printing by varying the exposure level for each dot in an image, wherein each image dot is classified as an edge dot or a non-edge dot, and wherein non-edge dots are attributed an exposure level that controls the optical density, and wherein edge dots are attributed an exposure level to control dot gain, and wherein edge-dots are classified into stable edge-dots and unstable edge-dots that might fail to print.

2. The method of claim 1, wherein the method comprises using an exposure level for unstable edge dots so that a corresponding dot is printed reliably.

3. The method of claim 2, wherein the exposure level of unstable edge dots is higher than the exposure level for stable edge dots.

4. The method of claim 1, wherein the exposure source acts differently by (i) operating for a different period of time, (ii) operating in different bursts, (iii) operating at a different intensity, (iv) scanning exposure across the surface at a different rate, or (v) exposing the surface by a different amount when forming a dot in any other suitable way, or (vi) any combination of (i) to (v).

5. The method of claim 4, wherein an exposure tag corresponding to each pixel in the input image is determined by analysis of pixels in its local neighbourhood.

6. The method of claim 1, wherein an input digital image is digitally processed to generate a second digital image comprising of exposure tags for each dot of a corresponding latent image; wherein each exposure tag corresponds to a particular exposure level for a dot in the latent image.

7. The method of claim 6, wherein the set of exposure tags includes at least one tag for non-edge dots, at least one tag for stable edge dots and at least one tag for non-stable edge dots.

8. The method of claim 7, wherein the exposure levels of unstable edge tags are set to the minimum values possible that still ensure that the corresponding dots are printed reliably.

9. The method claim 6, wherein the exposure level corresponding to non-edge tags is set such that printed solid patches have a desired optical density, and wherein the exposure levels corresponding to edge tags are set such that non-solid printed patterns have a desired dot-gain.

10. The method of claim 9, wherein the desired level of dot gain is substantially zero.

11. The method of claim 1 comprising converting a digital image; comprising pixels into a latent image comprising dots using light from a controllable light source arranged to strike a photoconductive surface and change charge distribution on the surface to form the dots making the latent image on the surface, the digital and latent images each having an edge and comprising an edge pixel or edge dot respectively, which is at or near the edge, and a non-edge pixel or non-edge dot respectively, which is not at or near the edge, wherein the method comprises the step of identifying whether or not a dot to be formed is an edge dot and using a different light source level incident at the photoconductive surface when forming the edge dot compared to when forming the non-edge dot such that charge distribution is changed to a different extent when forming the edge dot compared to when forming the non-edge dot.

12. The method of claim 11, wherein each pixel of the digital image has an associated instruction indicating a default light source level which should be used when forming its corresponding dot in the latent image, the method comprising forming the edge dot using a light source level different to the default light source level.

13. A xerographic machine, such as a printer or a photocopier arranged to carry out the method of claim 1.

14. Software which when run on a processor, e.g. of a xerographic machine is arranged to cause the method of claim 1 to be carried out.

15. A method of controlling a light source used in a xerographic process, the process comprising converting a digital image comprising pixels into a physical image comprising corresponding dots, the method arranged to achieve a desired light source level such that charge distribution on a photoconductive surface is changed to a desired extent and achieve a desired level of dot gain in physical images produced by the process, the light source being operable in a plurality of modes to produce differing levels of dot gain;
- an optical ratio between two xerographically produced physical images being defined as a ratio of mean average optical densities of each image;
- the method comprising using the xerographic process to produce a first physical image having a first mean average optical density and a first attribute which influences the mean average optical density of the image for a given level of dot gain and a second physical image having a second average optical density and a second attribute which influences the average optical density of the image for a given level of dot gain, the first and second physical images with their associated first and second attributes being such that at a particular optical ratio between the first and second physical images, the level of dot gain in the second physical image will be at the desired level,
- the method comprising adjusting the light source level to produce first and second physical images until they substantially provide the desired optical ratio between the xerographically produced physical images, and thereby establishing the desired light source level.

16. The method of claim 15, wherein each physical image comprises edge dots at an edge of the image and non-edge dots not at the edge and the attribute comprises the ratio of area covered by edge pixels to area covered by all pixels for each image.

17. The method of claim 15, wherein the light source level used to produce the first and second physical images is the same and the optical ratio is one, or the light source level used to produce the first and second physical images is the same and the optical ratio is not one, or the light source level used to produce the first and second physical images is not the same and the level of dot gain in the first physical image is known.

18. The method of claim 15, wherein the step of adjusting the light source level to produce first and second physical images which substantially provide the desired optical ratio comprises the step of measuring the first mean average optical density, producing one or more further physical images, measuring the average optical density for each of the further physical images to find a physical image which substantially has the desired second mean average optical density.

19. The method of claim 18, wherein the measuring step comprises an automatic measuring step without requiring human input.

* * * * *